(12) United States Patent
Williams et al.

(10) Patent No.: US 8,776,270 B2
(45) Date of Patent: *Jul. 15, 2014

(54) WINDPROOF WATERPROOF BREATHABLE SEAMED ARTICLES

(75) Inventors: Mark Alan Williams, Landenberg, PA (US); Jeffrey A. Klein, Wilmington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,136

(22) Filed: Apr. 28, 2009

(65) Prior Publication Data

US 2009/0208690 A1   Aug. 20, 2009

Related U.S. Application Data

(63) Continuation of application No. 10/998,070, filed on Nov. 24, 2004, now Pat. No. 7,624,456.

(51) Int. Cl.
*A41D 19/02* (2006.01)

(52) U.S. Cl.
USPC ............................................ 2/169; 2/161.6

(58) Field of Classification Search
CPC   A41D 19/006; A41D 19/001; A41D 19/0068
USPC ......... 2/161.1, 161.6; 428/53, 57, 58; 442/76, 442/77, 79, 82, 85, 86
See application file for complete search history.

(56) References Cited

U.S. PATENT DOCUMENTS

| | | | |
|---|---|---|---|
| 3,953,566 A | 4/1976 | Gore | |
| 3,962,153 A | 6/1976 | Gore | |
| 4,096,227 A | 6/1978 | Gore | |
| 4,187,390 A | 2/1980 | Gore | |
| 4,214,321 A | 7/1980 | Nuwayser | |
| 4,430,759 A | 2/1984 | Jackrel | |
| 4,532,316 A | 7/1985 | Henn | |
| 4,613,544 A | 9/1986 | Burleigh | |
| 4,776,209 A | 10/1988 | Patchel | |
| 4,814,412 A | 3/1989 | Crowther et al. | |
| 4,865,903 A | 9/1989 | Adiletta | |
| 4,935,287 A | 6/1990 | Johnson et al. | |
| 4,943,473 A | 7/1990 | Sahatjian et al. | |
| 5,020,162 A * | 6/1991 | Kersten et al. | 2/164 |
| 5,036,551 A | 8/1991 | Dailey et al. | |
| 5,221,572 A | 6/1993 | Meunier | |
| 5,244,716 A | 9/1993 | Thornton et al. | |
| 5,325,541 A | 7/1994 | Willard | |
| 5,409,761 A | 4/1995 | Langley | |
| 5,418,054 A | 5/1995 | Sun | |
| 5,480,455 A * | 1/1996 | Norvell | 623/36 |
| 5,560,044 A | 10/1996 | Masley | |

(Continued)

FOREIGN PATENT DOCUMENTS

EP   0 410 292 A2   7/1990
GB   2 326 606   6/1997

(Continued)

*Primary Examiner* — Katherine Moran
(74) *Attorney, Agent, or Firm* — Amy L. Miller (57) ABSTRACT

The present invention provides waterproof, breathable non-textile seamed articles which exhibit high levels of durability and allow wearers a high level of flexibility and article strength. This invention is of particular interest for use in dexterous hand coverings and conformable foot coverings.

23 Claims, 7 Drawing Sheets

(56) References Cited

U.S. PATENT DOCUMENTS

| | | |
|---|---|---|
| 5,560,974 A | 10/1996 | Langley |
| 5,566,405 A | 10/1996 | Masley |
| 5,569,507 A * | 10/1996 | Goodwin et al. ............... 428/76 |
| 5,603,119 A | 2/1997 | Rinehart |
| 5,700,544 A * | 12/1997 | Goodwin et al. ............... 428/76 |
| 5,728,451 A | 3/1998 | Langley et al. |
| 5,732,413 A | 3/1998 | Williams |
| 5,832,539 A | 11/1998 | Williams |
| 5,948,707 A | 9/1999 | Crawley et al. |
| 5,981,019 A | 11/1999 | Goodwin et al. |
| 6,154,886 A | 12/2000 | Hottner |
| 6,673,125 B2 | 1/2004 | Miller et al. |
| 6,716,778 B1 | 4/2004 | Hottner |
| 6,981,341 B2 | 1/2006 | Baychar |
| 2005/0058791 A1 | 3/2005 | Moehlenbrock et al. |

FOREIGN PATENT DOCUMENTS

| | | |
|---|---|---|
| JP | 56-120676 | 2/1983 |
| JP | 633304 | 2/1994 |
| JP | 07-216609 | 8/1995 |
| WO | WO2006/057822 | 6/2006 |

\* cited by examiner

WINDPROOF WATERPROOF BREATHABLE SEAMED ARTICLES

CROSS REFERENCE TO RELATED APPLICATIONS

This application is a continuation of U.S. patent application Ser. No. 10/998,070 filed Nov. 24, 2004, now U.S. Pat. No. 7,624,456, the entire contents of which are expressly incorporated herein by reference in its entirety.

FIELD OF THE INVENTION

The present invention relates generally to waterproof and breathable seamed articles which exhibit high levels of durability and allow wearers a high level of flexibility and article strength. This invention is of particular interest for use in dexterous hand coverings and conformable foot coverings.

BACKGROUND OF THE INVENTION

Waterproof, breathable articles are used for various purposes such as outdoor activities, sporting activities, skiing, cycling, military operations and fire fighting operations. A seamed article, such as a glove, may be waterproof because its outer shell material is waterproof. Alternatively, such a glove can also be rendered waterproof by a state of the art construction wherein the shell material is air-permeable and water permeable and another layer is arranged on the back side of the shell material which consists of a functional layer material which is waterproof and water vapor permeable (commonly referred to as a glove insert). Some materials suitable for such a functional layer include PTFE, expanded PTFE provided with hydrophilic impregnating agents and/or layers; breathable polyurethane layers; or elastomers, such as copolyether-ester and laminates thereof.

Due to the broad protective demands on such articles, they are commonly comprised of multiple material layers which are typically attached about the periphery of the glove. Typically, increased glove thickness is directly related to a loss of tactility and dexterity. Tactility and dexterity have traditionally improved by employing thin glove constructions or by treating the surface of the gloves with a sticky or gripping type of material, such as a low modulus polymer coating applied to the outer surface of the glove finger and palm areas. However, these coatings exhibit shortcomings such as lack of fingertip sensation and control, when applied to gloves over 10 mils thick. Several attempts have been made to provide improved tactility and dexterity; however, any successes have been limited.

Alternate thick thermoplastic film constructions have also been pursued in which the entire insert or seam is comprised of thermoplastic film. Unfortunately, these thick polyurethane seams are inherently stiff, making them undesirable for glove inserts. In addition, these thick polyurethane films have virtually no breathability, which also makes them undesirable for most glove or apparel applications.

U.S. Pat. No. 5,325,541 discloses a waterproof oversock comprising an inner liner composed of a waterproof, water vapor permeable, substantially nonstretchable fabric, wherein the waterproof, water vapor permeable inner liner fabric is heat sealable.

U.S. Pat. No. 5,981,019 discloses composite membrane material preferably which comprises a porous expanded polytetrafluoroethylene (PTFE) film laminated to a backing material.

U.S. Pat. No. 5,036,551 describes elastomeric composite fabrics which have a layered construction and are made of a microporous polymeric membrane, a water vapor permeable polymer, and an elastomeric thermoplastic nonwoven material. The elastomeric composite fabrics provide barrier properties with water vapor permeability and find utility in articles of wearing apparel and other articles which conform about another object.

While continual attempts have been made to create a thin, more dexterous and durable, waterproof, non-textile seamed article, none have succeeded at meeting all of these needs described above.

The present invention solves a long-felt need in the art for a multi-layer non-textile seamed construction which is capable of forming flexible articles without the need for folding or pleating techniques. The present invention provides waterproof, thin, breathable, non-textile seamed articles which are particularly well suited as dexterous hand covering inserts in glove systems or which may be used alone as a hand covering. The present invention has the added advantages of being strong for assembly in commercial factories without damage and durably waterproof in field use.

SUMMARY OF THE INVENTION

The present invention provides a seamed article comprising a first non-textile material comprising a first microporous polymer layer and a first thermoplastic polymer layer; a second non-textile material comprising a second microporous polymer layer and a polymeric layer; and a seam joining said first non-textile material to said second non-textile material wherein said seam has a stiffness of less than 25 g/in and a strength greater than 4 pounds per linear inch (pli). The seamed article exhibits surprising waterproofness and abrasion resistance.

The present invention further provides a seamed article comprising a first non-textile material comprising a first microporous polymer layer and a first thermoplastic polymer layer; a second non-textile material comprising a polymeric layer; and a seam joining said first non-textile material to said second non-textile material wherein said seam has a stiffness of less than 25 g/in and a strength greater than 4 pli.

The present invention yet further provides a seamed article comprising a first non-textile material comprising a first microporous polymer layer and a first thermoplastic polymer layer; a second non-textile material comprising a second microporous polymer layer and a polymeric layer; and a seam joining said first non-textile material to said second non-textile material wherein said first non-textile material exhibits waterproofness and abrasion resistance at greater than 63 cycles using ASTM test method D3886.

The present invention yet further provides a glove system comprising an outer shell material having a hand entry opening side with an edge on the hand entry opening side; and an insert comprising a first non-textile material comprising a microporous polymer layer and a first thermoplastic polymeric film layer; a second non-textile material comprising a microporous polymer layer and a second polymeric film layer; and a seam joining said first non-textile material to said second non-textile material wherein said seam has a stiffness of less than 25 g/in and a strength greater than 4 pli, wherein the glove insert is conformably dimensioned to be insertably received by the respective shell.

The present invention yet further provides a glove system comprising: an outer shell material having a hand entry opening side with an edge on the hand entry opening side; and an insert comprising a first non-textile material comprising a microporous polymer layer and a first thermoplastic polymeric film layer; a second non-textile material comprising a microporous polymer layer and a second polymeric film layer; and a seam joining said first non-textile material to said second non-textile material wherein said seam has a stiffness of less than 25 g/in and a strength greater than 4 pli, wherein the glove insert is conformably dimensioned to be insertably received by the respective shell and wherein the first non-textile material of the insert exhibits waterproofness and abrasion resistance at greater than 300 cycles using ASTM test method D3886

DETAILED DESCRIPTION OF THE INVENTION

The present invention provides a material suitable for making waterproof, breathable seamed articles useful as handcoverings, inserts for glove systems, foot coverings and other apparel.

For the purposes of this application the following terms shall be recognized to have the meaning set forth below unless otherwise indicated:

"Adhered" or "adhered together" is meant that the polymer material (e.g., expanded PTFE film) and textile material are joined together by suitable bonding media. The bonding media can be adhesive dots, adhesive applied as a continuous grid pattern, adhesive applied as continuous lines, a continuous, breathable adhesive layer, a fusion bonded interface, or any other material which provides for adhesion between the desired layers.

"ASTM test method D3886"—for the purposes of this patent the ASTM test method D3886 shall refer to a method by which a multidirectional mode with 0 emery paper is used as an abradant against said first non-textile material; wherein the first non-textile material is held in a fixed position by an inflatable diaphragm and wherein a four psi pressure is applied to said diaphragm and a load of one pound is applied to the abradant. For purposes of comparison results, a 0 emery paper from Norton Abrasives Worchester, Mass. A621 Emery Grit 0; Part number 662611 01290 is to be used.

"Breathable" refers to materials having a Moisture Vapor Transmission Rate (MVTR) of at least about 1,000 (grams/$(m^2)$(24 hours)).

"Composite" refers to a material formed from two or more parts. For example, a composite material may be formed of multiple layers of compounds wherein each layer may be joined to another layer via a suitable bonding means. The composite materials of this invention do not require any textile layer.

"Dexterity" refers to the ability to perform a difficult action quickly and skillfully with the hands, or to facilitate quickness in manipulation. Dexterous gloves provide the ability to perform a difficult action without the need to remove the gloves.

"Expanded PTFE" or ePTFE is used to denote a membrane that comprises a microporous structure of PTFE in which there exists nodes of PTFE interconnected by fibrils of PTFE. The basic construction and properties of expanded PTFE are described in a number of references, including U.S. Pat. Nos. 3,953,566; 3,962,153; 4,096,227; and 4,187,390, all incorporated herewith by reference.

"Insert" refers to a seamed article which provides the user with the barrier protection for preventing toxic and/or non-toxic fluids from contaminating the skin. The insert can provide waterproofness and/or breathability to a seamed article. An example of an insert is a glove layer which is inserted between the outer shell and a wearer's hand to provide protection to the wearer's hand.

"Interface layer" refers to a layer formed by the joining of two polymeric layers. For instance, in the present invention the interface layer is formed by sealing a thermoplastic polymer layer with a microporous polymer layer, resulting in the formation of an interface layer where the heat allows the thermoplastic polymer layer to co-mingle with the microporous polymer layer.

"Laminate"—for the purposes of this application, "Laminate" denotes a composite comprising a polymer layer and at least one textile layer which are typically adhered together.

"Microporous" is used to denote a continuous layer of material comprised of microscopic pores. The present invention preferably uses a microporous polymer membrane having a microscopic structure of open, interconnecting micro voids. It exhibits air permeability and as such, imparts, or does not impair, water vapour permeability. The microporous membrane used is typically of a thickness of 5 microns to 125 microns, most preferably of the order of about 5 microns to about 40 microns. The useful polymers of the microporous membrane material include plastic polymers as well as elastomeric polymers. Examples of suitable polymers include polyesters, polyamide, polyolefins including polypropylene and polyester, polyketones, polysulfones, polycarbonates, fluoropolymers, polyacrylates, polyurethanes, copolyetheresters, copolyetheramides and the like. The preferred polymers are plastic polymers. The most preferred microporous polymer membrane material is expanded microporous polytetrafluoroethylene (PTFE). These materials are characterized by a multiplicity of open, interconnecting microscopic voids, high void volume, high strength, soft, flexible, stable chemical properties, high water vapour transfer and a surface that exhibits good contamination control characteristics. U.S. Pat. No. 3,953,566 and U.S. Pat. No. 4,187,390 describe the preparation of such microporous expanded polytetrafluoroethylene membranes and are incorporated herein by reference.

"Tactility" refers to the capability to be felt or touched and the responsiveness to stimulation of the sense of touch. For instance, tactile gloves allow fingertip sensation and control.

"Thermoplastic" refers to materials capable of being repeatedly softened by an increase in temperature and hardened by a decrease in temperature. It refers to those materials that, when heated, undergo a substantially physical rather than chemical change and that in the softened stage can be shaped into articles by molding or extrusion, or fusion bonded to another material.

"Textile" is used to denote a woven, knit, or non-woven, material employing synthetic fibers, natural fibers, or blends of synthetic and natural fibers.

"Waterproof" is determined by conducting waterproof testing as follows: materials or composites (or seamed flat materials or composites) are tested for waterproofness by using a modified Suter test apparatus, which is a low water entry pressure challenge. Water is forced against a sample area of about 4¼ inch diameter sealed by two rubber gaskets in a clamped arrangement. The sample is open to atmospheric conditions and is visible to the operator. The water pressure on the sample is increased to about 1 psi by a pump connected to a water reservoir, as indicated by an appropriate gauge and regulated by an in-line valve. The test sample is at an angle and the water is recirculated to assure water contact and not air against the sample's lower surface. The upper surface of the sample is visually observed for a period of 3 minutes for the appearance of any water which would be forced through the sample. Liquid water seen on the surface is interpreted as a leak. A passing or waterproof grade is given for no liquid water visible within 3 minutes. Passing this test is the definition of "waterproof" as used herein.

"Whole Glove Leak Test" (WGLT) is used to determine water proofness of a glove. The whole glove leak tester is a device which applies air pressure to the interior of a finished (whole) glove to detect holes in the waterproof component. This test is set forth in U.S. Pat. No. 4,776,209, incorporated by reference. Air that leaks through is seen as air bubbles coming through a water reservoir. The test is non-destructive. Specifically, this test is performed with air pressure set at 2 psig.

In one embodiment, the present invention provides a seamed article comprising a first non-textile material comprising a first microporous polymer layer and a first thermoplastic polymer layer; a second non-textile material comprising a second microporous polymer layer and a polymeric layer; and a seam joining said first non-textile material to said second non-textile material to form an article. Suprisingly, the seam exhibits a stiffness of less than 25 g/in. A stiffness of less than 25 g/in is desirable to provide good dexterity to a seamed article. Even more surprisingly, the seam exhibits a strength greater than 4 pli. A seam strength of greater than 4 pli is considered to provide adequate durability for field use and for manufacturing ease.

The first non-textile material is comprised of a first microporous polymer layer adhered to a first thermoplastic polymer layer. The 15 second nontextile material comprises a second microporous polymer layer and a polymeric layer. In another embodiment, the second non-textile material may comprise only one polymeric layer.

The first non-textile material and the second non-textile material may share certain similar properties or exhibit properties independent of each other, including but not limited to: breathability, waterproofness, abrasion resistance, and windproofness.

For instance, the first non-textile material and the second non-textile material may both exhibit breathability. The first non-textile material and the second non-textile material may both exhibit waterproofness. In certain desired embodiments, the first non-textile material and the second non-textile material are breathable and waterproof. These material properties can depend in part upon the chosen materials for desired applications.

In another aspect of the present invention, the first non-textile material and the second non-textile material exhibit differing properties. For instance, either the first non-textile material or the second non-textile material exhibit the properties of breathabilty and/or waterproofness.

In a preferred embodiment of the present invention, at least one of the microporous polymer layers comprises an expanded polytetrafluoroethylene. In a yet further preferred embodiment of the present invention, the microporous polymer layer of the first non-textile material and the microporous polymer layer of the second non-textile material both comprise an expanded polytetrafluoroethylene.

In a preferred embodiment of the present invention, the first thermoplastic polymeric film layer comprises a thermoplastic polyurethane.

The seam joining said first non-textile material to said second non-textile material is of notable flexibility in that the seam exhibits a stiffness of less than 25 g/in and further exhibits a strength greater than 4 pli. The seam is remarkable in that it is softer and more flexible than previously available durably waterproof seams.

As is readily understood to one of skill in the art, examples of suitable sealing means to form said seams include but are not limited to impulse sealing, radio frequency sealing, ultrasonic welding, microwave welding, and heat sealing. In a preferred embodiment, the seam is heat weld constructed via a welding tool. During heat weld construction of the seam, the first microporous polymer layer or said second microporous polymer layer act as a release agent to prevent adhesion of the layer to the welding tool upon contact.

In another aspect of the present invention, the seamed articles exhibit surprising abrasion resistance. For instance, at least the first non-textile material may further exhibit waterproofness and abrasion resistance at greater than 63 cycles using ASTM test method D3886.

In a preferred embodiment, at least the first non-textile material exhibits abrasion resistance greater than 300 cycles.

Figure 1:
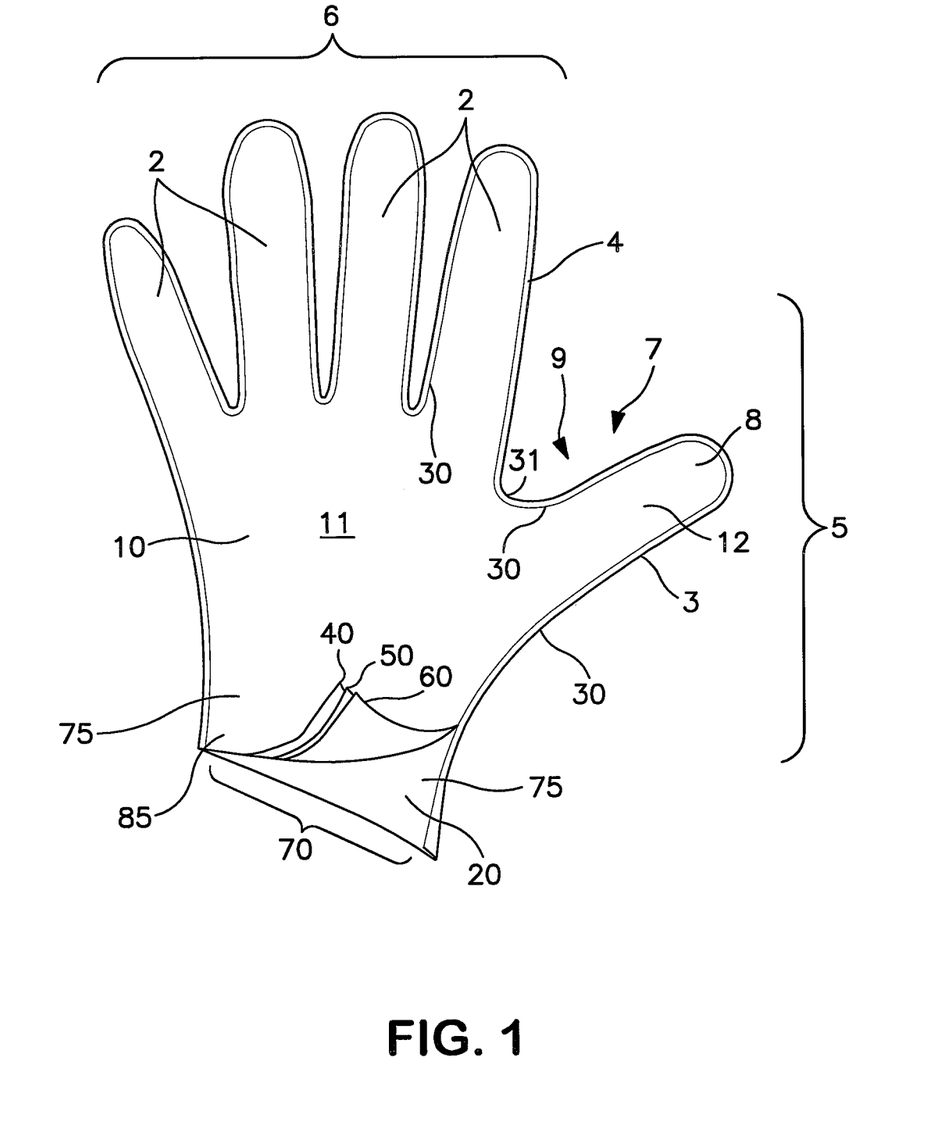
FIG. 1 shows a cut-away view of the top side of a glove insert depicting the orientation of the layers.

FIGS. 1 through 7 are provided herewith to demonstrate the present invention. FIG. 1 shows a seamed article in the form of a glove insert 5 of the present invention. The glove insert 5 is shaped to include a finger portion 6 enclosing the fingers of the wearer, a dorsal or back portion (not shown) which covers the back of the wearer's hand, a thumb portion enclosing the thumb 7 of the wearer, a palm portion covers the palm of the wearer, a cuff portion enclosing the wrist of the wearer, and a hand entry opening 70 through which the wearer slips his or her hand into the glove insert 5. The finger portion 6 is shown in these figures as having four separate coverings for the fingers. It could equally well be in the form of a mitt or a lobster pattern (two separate finger coverings) without detracting from the principle of the invention.

The glove insert 5 is formed from a first non-textile material 10 and a second non-textile material 20. The first non-textile material 10 and a second non-textile material 20 are joined around the desired periphery by a suitable sealing means to form a seam 30. It is preferred that the seam is a waterproof sealed edge. An opening 70 is provided to allow the wearer's hand to enter the glove insert.

The first non-textile material 10 piece forms one side of the glove insert 5 with a first palm portion 11 of the palm or front side of the glove insert 5 as well as a first thumb side 12 of the thumb portion 7. The second non-textile material 20 piece forms the opposite side of the finger portion, a second thumb side of the thumb portion as well as a second palm portion of the back side of the glove insert 5. A palm portion of the glove insert is thus formed from the first palm portion 11 of the first non-textile material 10 piece and the second palm portion of the second non-textile 20 piece which are adhered together, as will be described later with reference to the further figures.

The thumb portion 7 of the glove insert 5 has a thumb tip 8, a finger-side thumb outer edge 9 on the side of the thumb portion adjacent to the finger portion, and a radial-side thumb outer edge 3 on the radial side of the glove insert 5. The thumb portion 7 is formed from the first thumb side 12 of the first non-textile material piece 10 and the second thumb side of the second non-textile piece 20. The finger portion 6 has a finger radial side 4 on the radial side of the glove insert 5 and a finger ulnar side 2 on the ulnar side of the glove insert 5. A crotch 31 is situated between the thumb portion 7 and the finger portion 6. The crotch 31 is thus situated at the position at which the finger radial side 4 meets the finger-side thumb outer edge 9. The cuff portion 75 (present on both dorsal and ulnar pieces) of the glove insert 5 is adjacent to the hand entry 70 of the glove insert 5 and has an ulnar-side cuff outer edge 85 on the ulnar side of the glove insert 5.

Figure 2:
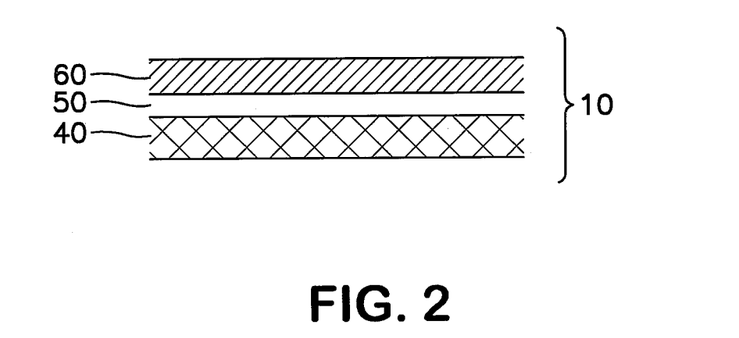
FIG. 2 shows a cross section of a thermoplastic polymer layer adhered to a microporous layer via a layer of adhesive.
Figure 3:
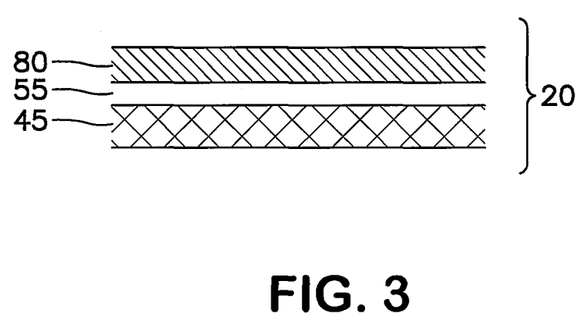
FIG. 3 shows a cross section of a thermoplastic polymer layer adhered to a microporous polymer layer via a layer of adhesive.

As shown in FIG. 2, the first non-textile material 10 is comprised of a first microporous polymer layer 40 adhered to a first thermoplastic polymer layer 60. The first microporous polymer layer 40 and first thermoplastic polymer layer 60 may be adhered via an adhesive 50. Similarly, as shown in FIG. 3, the second non-textile material 20 is comprised of a second microporous polymer layer 45 adhered to a polymeric layer 80. The second microporous polymer layer 45 and the polymeric film layer may be adhered via a second adhesive 55. The adhesive layers, including both adhesive 50 and second adhesive 55, may be applied in a continuous or discontinuous manner, depending on the desired outcome. If a breathable area of an article is desired, the adhesive layer must be either a breathable continuous adhesive or a discontinuous adhesive. A breathable adhesive refers to a hydrophilic adhesive. The breathable hydrophilic adhesive is selected to provide high water vapor transmission as well as good adhesion between the layers. Examples of breathable adhesives include but are not limited to polyether polyurethanes and moisture cured polyether polyurethanes. The adhesive layer may additionally include fillers if desired. The discontinuous adhesive may be either breathable or non-breathable. Application of a discontinuous adhesive layer to adhere the microporous polymer layer to either a polymeric layer or thermoplastic polymer layers may be produced by a number of methods such as, but not limited to, screen printing, gravure printing, and spraying, all of which are known to one skilled in the art.

The microporous polymer layers 40 and 45 may be comprised of similar or differing materials as illustrated in FIGS. 2 and 3. The microporous polymer layer may comprise expanded PTFE, microporous films made from thermoplastic polymers, microporous films made from thermoset polymers as well as microporous films made from elastomeric polymers. Examples of suitable polymers include polyesters, polyamide, polyolefins including polypropylene and polyester, polyketones, polysulfones, polycarbonates, fluoropolymers, polyacrylates, polyurethanes, copolyetheresters, copolyetheramides and the like. The preferred microporous polymer material is microporous expanded PTFE. In general, the microporous polymer layer may vary in thickness.

The microporous polymer layer used in this invention optionally may be coated with one or more additional, continuous polymeric layers, such as adhesives or oleophobic layers. For a breathable construction, the continuous polymeric layers used is a hydrophilic polymer. The hydrophilic layer selectively transports water by diffusion but does not support pressure-driven liquid or air flow. This characteristic imparts to the barrier layer and in turn to articles made from it, such as socks or gloves, good contamination control characteristics by functioning as a barrier to contaminants of all sizes. Furthermore, the water vapor transmitting characteristics of the material allow for comfort characteristics to the wearer. It is preferred that at least one of the microporous polymer layers 40 or 45 comprises an expanded polytetrafluoroethylene.

The thermoplastic polymer layer 60 may comprise thermoplastic polyurethane films, silicone films, co-polyetherester films, co-polyetherester amide films, individually or in combination or other suitable continuous water vapor permeable polymers. It is preferred that the thermoplastic polymer layer comprises continuous, water vapor permeable polymer polyurethanes, particularly those containing oxyethylene units, as for example those described in U.S. Pat. No. 4,532,316.

Figure 4:
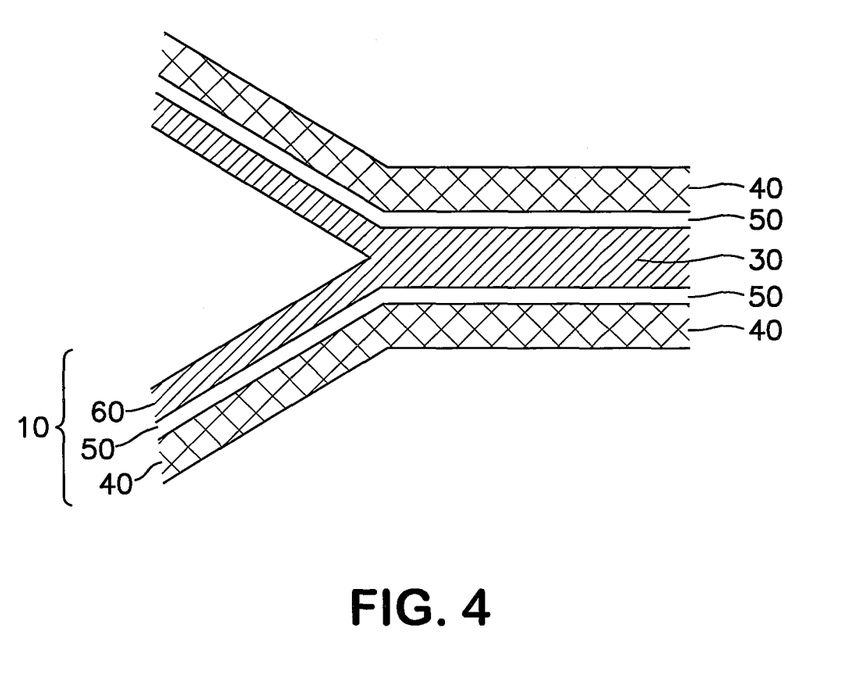
FIG. 4 shows a cross section of a waterproof sealed edge formed by joining two identical non-textile materials.

The thermoplastic polymer layer 60 may be either monolithic or microporous. The specific polymer type employed should be chosen so that its bonding temperature is in the range desired for production of the sealed seam 30, as shown in FIG. 4. It is advantageous for the melting point of the thermoplastic polymer to be below the melt or degradation temperature of the microporous polymer.

Thermoplastic polymers with bonding temperatures between 50° C. and 200° C. are desirable. Thermoplastic polymers with higher bonding temperatures can be used in this invention, provided their bonding temperature is below about 400° C., the temperature at which microporous membrane materials such as expanded PTFE begins to soften or melt. The use of a thermoplastic polymer allows the pattern to be heated around a desired periphery to weld material pieces of the pattern together.

Thin thermoplastic polyurethane layers are particularly useful, as they can produce flexible, ductile, soft, composite layers which in turn can create more dextrous and tactile gloves incorporating these composites. It is desirable that the thermoplastic polymer layer has a thickness of less than 2 mils and even more preferable, less than 1.5 mils, and in a most preferred conformation, less than or equal to 1 mil. Thin thermoplastic polyurethane films are available from a variety of sources known to a skilled artisan. A preferred embodiment uses a monolithic thermoplastic polyurethane as the first thermoplastic polymer layer 60.

As shown in FIG. 4, a seamed article may be constructed per this invention using two opposing layers of the same non-textile material, such that the opposing sides of the seamed article are comprised of identical materials. As shown in this FIG. 4, the first non-textile material 10 is comprised of a first microporous polymer layer 40 and a first thermoplastic polymer layer 60. The first microporous polymer layer 40 and first thermoplastic polymer layer 60 may be adhered via an adhesive 50. For simplicity of illustration in showing similar components, FIG. 4 shows two layers comprised of elements 40, 50 and 60. Two identical thermoplastic polymer layers 60, are oriented so that they are in contact with one and other. In this view the two thermoplastic polymer layers are joined by a seam 30 which has a waterproof sealed edge constructed using a heat weld seam. However, any other suitable seam may be used depending upon the desired application. When the present invention is practiced in this manner using a first non-textile material 10 and a second non-textile material comprised of identical materials the composition and attributes of the article is uniform throughout. However, one reading this description should understand that all of the described elements of the first non-textile material 10 and the second non-textile material 20 are required to be present to practice this invention. Thus, it is possible to have the first microporous polymer layer 40 and the second microporous polymer layer 45 are comprised of the same material. Additionally, it is possible that the first thermoplastic polymer layer 60 and the polymeric layer comprise the same material and that the bonding of the layers is through the use of an adhesive layer 50 which can be identical to the second adhesive layer 55 if uniformity of construction is desired throughout an article.

Figure 5:
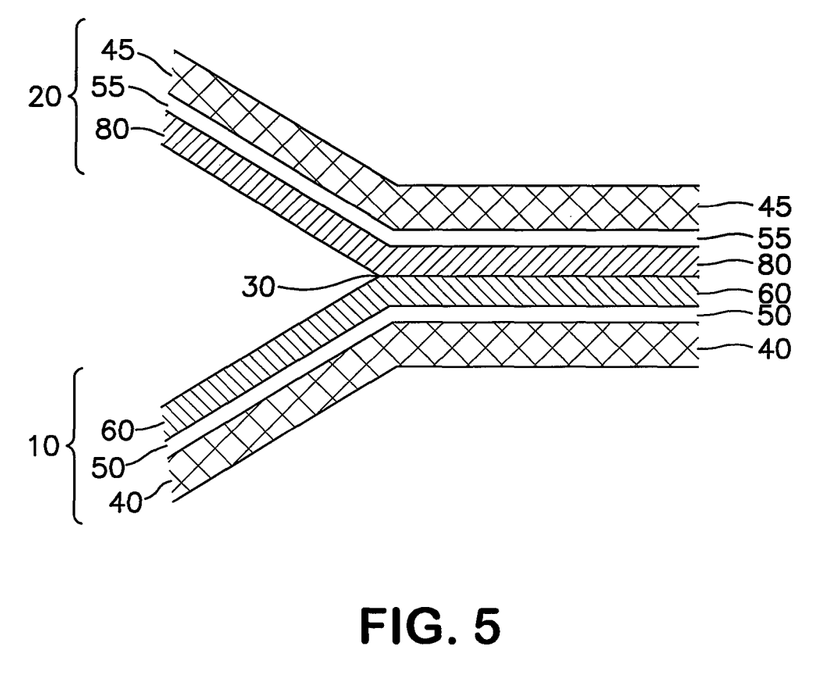
FIG. 5 shows a cross section of a waterproof sealed edge formed by joining two differing non-textile materials.

FIG. 5 shows a cross section of a waterproof sealed edge or seam 30 formed by joining one sheet of the composite layer shown in FIG. 2 and one sheet of composite layer shown in FIG. 3. As shown in FIG. 5, the seamed article thus is comprised of differing non-textile layers. As further shown in FIG. 5, the second non-textile material is comprised of a second microporous polymer layer 45 which differs in composition from that of the first microporous polymer layer 40 of the first non-textile material. Further, the first thermoplastic polymer layer 60, differs in composition from that of the polymeric film layer 80. One of skill, may desire to use differing materials in the first non-textile material 10 and the second non-textile material 20 depending upon the intended application of the seamed article. Similarly, one of skill may choose to use differing adhesives or adhesive application methods on different areas of an article. It is important to note that while a thermoplastic polymer is required to be present in the first non-textile material, no such thermoplastic polymer is required to be present in the second non-textile material. It is only required that the second non-textile material comprise a polymeric film layer, which may or may not be a thermoplastic polymer. It is further important to note that the thermoplastic polymer may be mated with either the microporous polymer layer or the polymeric layer of the opposing material via a seam 30.

As shown in FIG. 5, different materials can be used in the polymeric layers of the first non-textile material 10 and the second non-textile material 20. A weld seam may be used to bond the opposing composite layers of the first non-textile material 10 and the second non-textile material 20. The composite layer designated as second non-textile material 20 can be comprised of expanded PTFE or another second microporous polymer layer 45, a second adhesive layer 55 which can be the same or different from adhesive 50 joining the first microporous polymer layer 40 to a thermoplastic layer 60. Any or all of the polymeric layer 80 may be different from the materials used for layers 40, 50, and 60, respectively in the composite layer designated as the first non-textile material 10. The specific polymeric layer 80 can be chosen to impart some particular property not achievable with the first thermoplastic polymer layer 60. For example, a dexterous, durable insert can be produced using one first thermoplastic polymer layer 60 to form the bond to the differing adjacent layer of the second non-textile material 20. Thus, the polymeric film layer 80 can be chosen to impart desired characteristics to the second non-textile material 20 while the first thermoplastic polymer layer of the first non-textile material 10 may be chosen to impart different physical characteristics, thereby providing a seamed article which can effectively be engineered to meet the needs of specific user requirement in view of environmental or application requirements.

Figure 6:
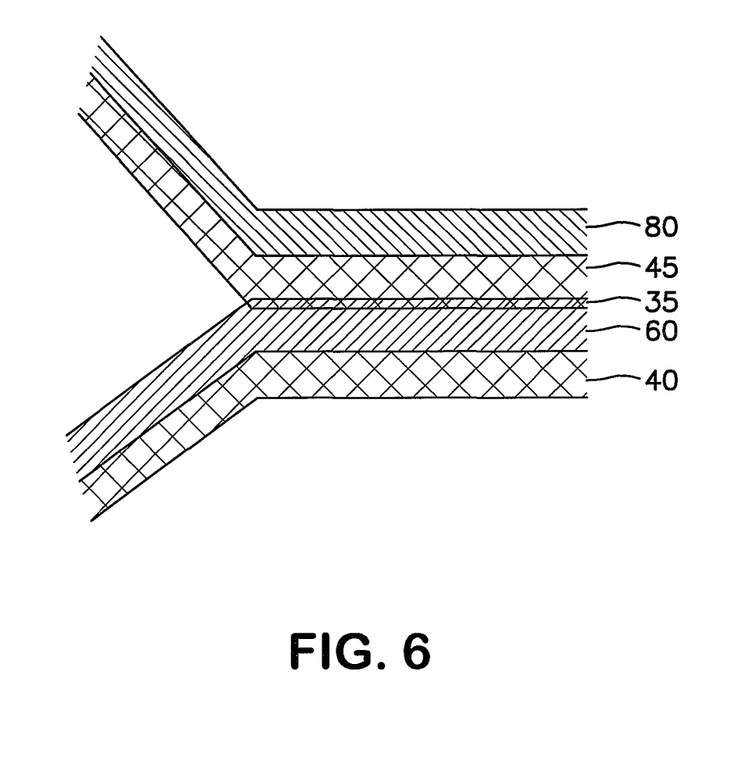
FIG. 6 shows a cross section of a waterproof sealed edge formed by joining two non-textile materials wherein the seam is formed by sealing a thermoplastic polymer layer with a microporous polymer layer, resulting in the formation of an interface layer.

FIG. 6 shows cross section of a waterproof sealed edge of a seamed article. The seam is formed by joining two non-textile materials. In this instance a thermoplastic polymer layer is sealed to a microporous polymer layer resulting in the formation of an interface layer 35 where the two polymeric layers meet. The interface layer 35 provides strength and durability to the construction while also imparting dexterity. As would be understood to one of skill in the art, the seamed articles of this invention may comprise any shape and, when desirable, can be fashioned into an insert for clothing, hand coverings or foot coverings desirable for a particular application. Also, an insert shaped as a hand covering may be incorporated as an integral element of a glove system or may be employed in a stand-alone application for use as a thin and dexterous hand covering.

Figure 7:
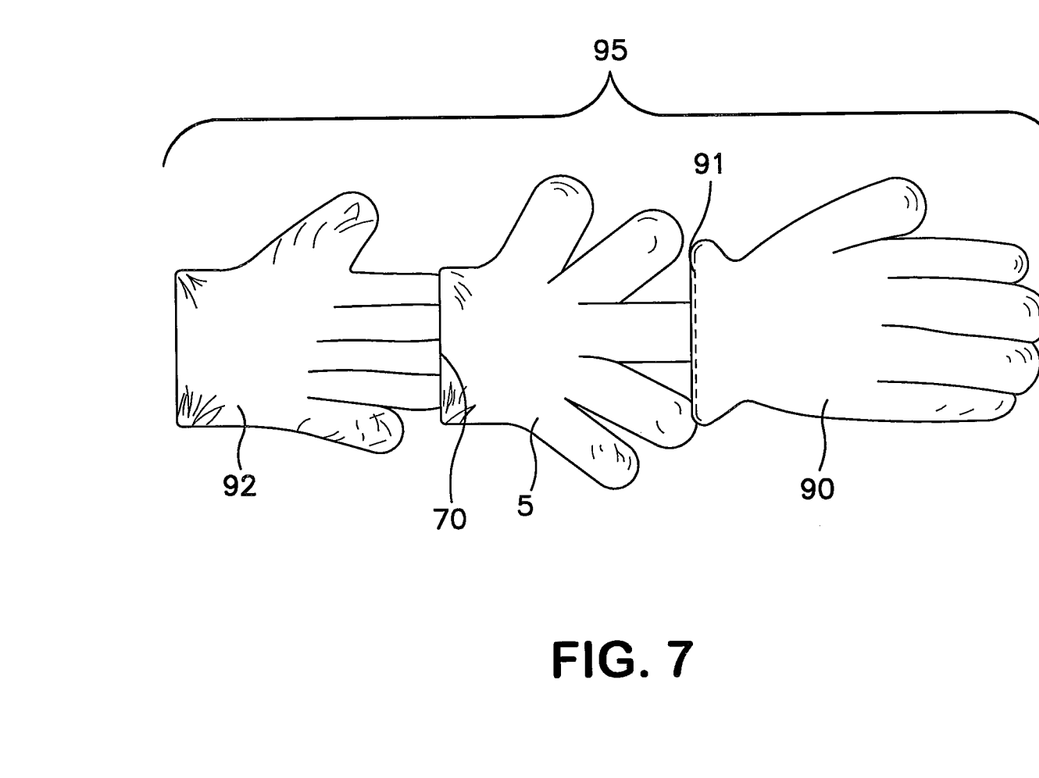
FIG. 7 shows a hand covering system constructed using three principal layers wherein an insulation layer is fitted into a waterproof, breathable insert, which fits into an outer shell of a hand covering of the invention.

FIG. 7 illustrates generally a glove system 95. The glove system of the present invention comprises an outer shell material 90 and an insert 5. The insert 5 comprises a first non-textile material comprising a microporous polymer layer and a first thermoplastic polymeric film layer; a second non-textile material comprising a microporous polymer layer and a second polymeric film layer; and a seam joining said first non-textile material to said second non-textile material. It is preferred that the seam has a stiffness of less than 25 g/in and a strength greater than 4 pli wherein, the glove insert is conformably dimensioned to be insertably received by the respective outer shell. The glove system may further comprise an insulation or insulating layer 92. In certain applications it may be desirable to include a glove liner positioned or arranged inside of the shell material, wherein the glove insert is located between the glove liner and the shell material.

In a preferred embodiment, the insert of the glove system is breathable. In a yet further preferred embodiment, the first non-textile material of the insert of the glove system exhibits waterproofness and abrasion resistance at greater than 63 cycles using ASTM test method D3886. It is yet further preferred that the first non-textile material of the insert exhibits waterproofness and abrasion resistance at greater than 300 cycles.

Waterproofness of a glove may be tested using the Whole Glove Leak Test described above.

The shell material is formed to shape to comprise an entry opening such as a hand entry opening side with a shell edge on the hand entry opening side. As described above, the glove insert comprises a first non-textile material comprising a microporous polymer layer and a first thermoplastic polymeric film layer; a second non-textile material comprising a microporous polymer layer and a second polymeric film layer; and a seam joining said first non-textile material to said second non-textile material. The seam has a stiffness of less than 25 g/in and a strength greater than 4 pli. The glove system can optionally include an insulation layer. The shell material is preferably waterproof. The glove system may also optionally comprise a cuff sleeve arranged proximate to said hand entry opening located inside of the shell with a lower cuff edge and an upper cuff edge, said lower cuff edge being arranged inside of the shell below the shell edge by a predetermined underlength and connected to the edge, the upper cuff edge projects over the shell edge by a predetermined overlength; wherein the lower cuff edge is connected directly to the shell underneath the shell edge. The lower cuff edge can be adhesively bonded to the shell by a waterproof adhesive seam; attached to the shell by a sewn seam that is sealed on the interior cuff sleeve by a waterproof seam sealing tape, or attached by any other suitable means. In a desired embodiment the shell material can be provided with an interior lining layer. The glove insert and glove liner are arranged inside of the shell material and wherein the glove insert is between the glove liner and the shell material. As used herein, a "glove system" means at least an outer glove shell 90 and an insert 5. The glove system also may optionally include an insulation layer 92 (shown) and/or an additional inner lining, (not shown). Insulation or inner linings typically comprise pile or fleece textile layers to provide thermal advantages. As should be understood, the insulation layer 92 may be made from any material which is desirable for a particular application. Also, the glove insert 5 may be incorporated as an integral element of a glove system 95, or may be used alone. The glove insert is comprised of a first non-textile material comprising a microporous polymer layer and a first thermoplastic polymeric film layer; and a second non-textile material comprising a microporous polymer layer and a second polymeric film layer. A seam joins the first non-textile material to the second non-textile material, and the seam surprisingly has a stiffness of less than 25 g/in and a strength greater than 4 pli. When used in a glove system the glove insert is defined by a first hand shaped portion comprised of the first non-textile material 10 and a second hand shaped portion comprised of a second non-textile material 20 matingly dimensioned relative to the first hand shaped portion, the first and second first hand shaped portions being seamed, one to each other, to form a hand covering having a plurality of finger stalls, a thumb stall, a palm portion, and a dorsal portion. In embodiments for which the glove system may further comprise an insulation layer 92, the insulation layer is located between a wearer's hand and the glove liner when a glove is in use. When used as an integral element of a glove system, the insert is conformably dimensioned to be insertably received by a respective glove shell. The outer glove shell or shell 90 can be produced from any suitable material, such as but not limited to knit, woven or nonwoven materials, leather, composite fabrics or any other suitable material. The outer glove shell may be patterned in accordance with any suitable pattern, such as but not limited to the Clute Cut Pattern, Gunn Cut Pattern or the Fourchette Pattern, for example. As depicted in FIGS. 1 and 7, the glove system 10 may include any of the following: a palm portion 11, finger portions 6, a thumb portion 7, or a hand entry opening 70 facing inwardly of the wearer. Although the glove system 5 is illustrated as a conventional glove system, in the sense that it includes an individual finger stall for each finger of a human hand and a thumb stall, it is to be understood that the teachings of the present invention may be applied to other glove systems having less than four finger stalls, but at least one. Additionally, the glove system 5 may be provided with an elastically yielding area (not shown) proximate to a cuff portion 75 to provide close contact of the glove system to a wearer's wrist.

While variations on the present invention are obvious to one of skill in the art, it is specifically recited that in certain embodiments of the seamed article, the first thermoplastic polymeric film layer may comprise a thermoplastic polyurethane. The first microporous polymer layer of the first non-textile material and the microporous polymer layer of the second non-textile material may both comprise expanded polytetrafluoroethylene.

In one embodiment, the composite layer of the first non-textile material 10 is formed by adhering expanded PTFE layer 40 to thermoplastic layer 60 using adhesive 50. The orientation of the composite layers of the first non-textile material 10 and of the second non-textile material 20 can be adapted as required for individual applications. For example, when formed into a hand covering for which the back of a wearer's hand requires a different level of protection than one's palm, the layers of the first non-textile material 10 and the second non-textile material 20 in may be oriented such that the second non-textile material 20 is reversed with the polymeric film layer oriented outward, away from the bonding surface of the first thermoplastic polymer layer 60 of the first non-textile material 10. The only restriction is that the at least one thermoplastic polymer layer must be oriented towards the mating composite layer. In each of these embodiments, a waterproof, dexterous, durable non-textile glove insert can be produced when composite layers of the first non-textile material 10 and the second non-textile material 20 are sealed around the periphery by a seam 30 as described previously being waterproof and sealed.

The particular first thermoplastic polymer layer 60 is chosen based on the barrier properties required by the end application. Critical to the present invention is the requirement that the seamed article comprises at least one thermoplastic polymer layer. The thermoplastic polymer layer provides the ability to form a soft yet sufficiently strong seam when sealed to a mating surface. In certain embodiments of this invention, more than one thermoplastic polymer layer may be present. The hand coverings produced in accordance with the present invention are desirable for use as inserts in glove systems, hand covering systems comprising a shell, insert and liner. The hand coverings may also be used as a stand-alone non-textile glove application for a hand covering to meet the needs of many varied applications through proper material selection. For example, a hand covering without any shell or liner could be used as a clean room glove produced of only a first non-textile material and second non-textile material layers. One such example is the use of a combination of expanded PTFE and thermoplastic polyurethane made in accordance with the teachings of the present invention.

As shown in the Table 1 below. it has been found that the articles of the present invention are flexible, thin and strong, resulting in gloves that are dexterous and durable.

TABLE 1

Seam Property Comparison

| Seam Property Measured | Present Invention | A - TPU non-textile insert (1 mil TPU films used) | B - 2 Layer nonwoven/ ePTFE/PU | C - 3 Layer nonwoven/ ePTFE/PU | D - ePTFE insert | E. - 2 Layer knit/TPU Laminate |
|---|---|---|---|---|---|---|
| Thickness (mils) | 5.0 | 2.0 | 14.0 | 22.0 | 3.8 | 20.5 |
| Strength (pli) | 4.5 | 0.8 | 6.9 | 12.6 | 3 | 12 |
| Stiffness (g/in.) | 11 | 3.8 | 30 | 91 | 11 | 44 |

Table 1 compares the breathable non-textile insert of the present invention with (A) a polyurethane film insert; (B) a 2 layer expanded PTFE/polyurethane/nonwoven textile laminate insert; (C) a 3 layer nonwoven textile/expanded PTFE/ polyurethane/nonwoven textile laminate insert; (D) the expanded PTFE/polyurethane insert manufactured by a fusion bonded composite as described in U.S. Pat. No. 4,814, 412 (E) a 2 layer knit textile/polyurethane laminate insert.

An additional surprising attribute of this invention is the flexibility of the resultant seams. Comparison of the flat film properties, including thickness, MVTR and abrasion resistance for the embodiment of Example 1 with the same comparative products described for Table 1 are shown in Table 2. Comparison of this data clearly show that the present invention provides significantly greater abrasion resistance than all the comparative inserts tested, including those with a textile layer.

TABLE 2

Base Layer Property Comparison

| Film Property Measured | Invention | A - TPU film-only insert (1 mil TPU films used) | B - 2 Layer nonwoven/ ePTFE/PU | C - 3 Layer nonwoven/ ePTFE/PU | D - coated ePTFE film-only | E. - 2 Layer knit/TPU Laminate |
|---|---|---|---|---|---|---|
| Thickness (mils) | 2.5 | 0.8 | 6.5 | 12 | 1.3 | 11 |
| MVTR (g/cm2/24 hr) | 9,900 | 12,000 | 8,400 | 7,000 | 10,600 | 6,400 |
| Abrasion (cycles) | 1750 | 25 | 375 | 700 | 63 | 1000 |

Sample A has the lowest stiffness, but inadequate seam strength and poor abrasion resistance. Similarly, sample D, as described in U.S. Pat. No. 4,814,412 has an acceptable low stiffness and somewhat improved seam strength; unfortunately, sample D has lower than desired abrasion resistance and seam strength. Surprisingly, present invention provides an insert or seamed article with low stiffness seams, good seam strength breathability, and superior abrasion resistance.

The seamed articles of the present invention may further comprise decorations, fasteners, treatments to the surface of gloves or stand alone inserts with a sticky or gripping type of material. such as a low modulus polymer coating applied to the outer surface of the glove finger and palm areas.

The following test methods were used to evaluate the properties and performance of this invention and comparative products:

Waterproofness (Initial)

ASTM method D751 Procedure B describes the test used for waterproofness. In this test, the sample was restrained, a fixed hydrostatic head of 0.7 lbs/in$^2$ minimum applied and held for 3 minutes minimum. A passing result is considered as no leakage after 3 minutes where leakage is defined as the appearance of one or more droplets anywhere within the three and one-half inch minimum diameter test area. The side of the sample facing the shall be used to test the waterproofness of the sample.

Thickness

ASTM test method D1777 entitled "Standard Test Method for Thickness of Textile Materials" was used to measure the thickness of the laminate layers 10 and 20, the comparative materials, as well as the sealed seams.

Stiffness

ASTM test method D6828 entitled "Standard Test Method for Stiffness of Fabric by the Blade/Slot Method" was used to measure the stiffness of the sealed seams shown in Table 1. This method involves laying a flat 4" by 4" material across a specified gap and then pressing a blade onto the material to force it to move through the gap. For seam testing, this test method was modified such that a glove seam runs along one edge of the 4" by 4" specimen, with seam oriented perpendicular to the blade during the test.

For the purposes of this patent the following test parameters have been used: the slot width is maintained at 0.25 inches. The beam is 100 grams. The average of at least four individual measurements was recorded. In order to test the seams, a 4" by 4" specimen was obtained with seam running along one side. The seam was oriented perpendicular to the penetrating blade during the test.

Seam Strength, Break Energy, Toughness, Modulus

ASTM test method D1876 entitled "Standard Test Method for Peel Resistance of Adhesives (T-Peel Test)" was used to measure the seam break strength shown in Table 1. The specimens were cut to 6" by 1". A length of 4" was used.

MVTR

ASTM test method E96 entitled "Test Methods for Water Vapor Transmission of Materials" was used to measure the breathability of the materials shown in Table 2. For the purposes of this patent the following test parameters have been used: the water method, inverted cup (procedure section 12.4 of ASTM E96-00); temperature=70+/−2 degrees Fahrenheit; RH+50+/−2%; air velocity=580 ft/min' test interval+2 hours. The side facing the water is the side that would be oriented towards the body in use. For the present invention the thermoplastic side was used. The sealant used for testing was a 4 mil thick thermoplastic polyurethane. Three to five individual measurements were reported for each material type. Specifically, the inverted cup method was used with a free stream air velocity of 550±50 fpm as measured 2 inches above the specimen. The air flow was measured at least 2 inches from any other surface and allowed to run for 2 hours. The resulting weight measurements were taken at only the start and completion of the test. The cup dimensions were 2.5 inches in diameter and 2 inches in depth.

Abrasion Resistance to Waterproofness

ASTM test method D3886 entitled "Abrasion Resistance of Textile Fabrics (Inflated Diaphragm Method)" was used to measure the abrasion resistance of the materials shown in Table 2. Specific test parameters were that the multidirectional mode was used with 0 emery paper as the abradant. [0 Emery paper was obtained from Norton Abrasives Worcester, Mass. A621 EmeryGrit: 0; Part No. 662611 01290]

Samples were tested by abrading the side of the material facing away from the body (toward shell). The abrasion test was conducted in a multidirectional mode using 0 emery paper as the abradant. A solid rubber diaphragm without electrical contact (grounding) pin was used. The diaphragm has a smooth surface without bumps. The diaphragm was inflated to 4=/−0.25 psi. A load of one pound was applied to the abradant. The test was completed at 250 cycles, or 100 double strokes per revolution. The abradant paper was changed every 125 cycles. Once abrasion is complete, the specimens were tested using the water permeablility test method specified as ASTM D751.

Pressure was applied by inflating a diaphragm to 4 psi. The diaphragm used had no contact pin. A load of 1 lb. was applied to the abradant. After the predetermined number of abrasion cycles, ASTM test method D751 as described above was used to test waterproofness Tensile Max Load & Break Energy ASTM test method D5035 entitled "Standard Method for Breaking Force and Elongation of Textile Strips (Strip Method)" was used to measure the strengths shown in Table 1. The specific test used was the 1" wide cut strip method with a 12"/min crosshead speed.

The following non-limiting examples are provided to further illustrate the present invention:

Example 1

Waterproof, Windproof, Breathable, Non-textile Insert

A waterproof, windproof, breathable non-textile insert was produced as follows. For example, a microporous, expanded PTFE film weighing about 25 gm/m$^2$ and about 40μ thickness was produced. Next, the expanded PTFE film was adhered to a 1 mil thick, monolithic, thermoplastic polyurethane film (available from Deerfield Urethane, South Deerfield, Mass., part number PT1710S) using a continuous layer of breathable polyurethane adhesive applied at a coverage rate of 8 to 10 gm/m$^2$. The breathable polyurethane adhesive was a moisture-cured polyether polyurethane adhesive, as described in U.S. Pat. No. 4,532,316.

A gravure printing process was used for the lamination. The multi-layer construct was then allowed to cure. This resulted in an article (in conformance with that shown in FIG. 2) having a total thickness of about 2.5 mils and an average MVTR about 9,900 gm/24 hr/cm$^2$. Once the desired waterproof, windproof, breathable layer was produced, a non-textile glove insert of the present invention was produced by mating two opposing pieces of expanded PTFE/adhesive/thermoplastic polyurethane composite in the form of a hand together. The two opposing composite pieces were stacked together, with the thermoplastic polyurethane surfaces facing one another, and the ePTFE surfaces oriented outward on the top and bottom of the stack. Heat was applied to the top of the stack using a heated steel die at approximately 165° C. for three seconds under a pressure of approximately 320 psi, thereby welding together the polyurethane film layers of each of the two pieces in the stack. The steel die was configured in the shape of a hand, such that the two pieces were welded together in the shape of a hand. A steel rule cutting blade which was formed in a slightly larger hand shape than the heated steel die was used to cut the two joined pieces. This glove insert was air impermeable when tested with a leakage detector as described by U.S. Pat. No. 4,776,209. The seam strength measured about 4.5 pli, and the seam stiffness measured to be about 11 g/in.

A finished glove was further then constructed by attaching the glove insert of the present invention to an outer wear-resistant shell, and an inner liner material using the following traditional glove construction method. The insert was inverted (turned inside out), and adhesive tabs attached to the fingertips and cuffs on the polyurethane film side of the insert. These tabs were then sewn to corresponding locations of the textile glove liner. Once attached to the liner, the insert was re-inverted over the liner. Adhesive tabs were then attached to the fingertips and cuff of the ePTFE film side of the insert. The glove shell was inverted, and the adhesive tabs of were then sewn to corresponding locations of the inside of the shell. Once attached to the insert, the glove shell was re-inverted over the insert and liner. The cuffs of all components were sewn together and closed off, resulting in a finished glove comprised of a shell, insert, and liner that are integrally connected to prevent separation of layers. The finished glove was tested and still found to be waterproof and windproof when tested with the air leak detector described above at about 4 lbs./in.$^2$ pressure.

Example 2

Discontinuous Adhesive Application

A non-textile insert layer was produced as in described above in Example 1, except that the breathable polyether polyurethane adhesive was applied in a discontinuous manner using gravure printing to the ePTFE film. This non-textile layer was then used to complete the glove inserts of this invention using the same insert construction method described above. These non-textile glove inserts were then constructed into finished gloves using the same glove construction method described above.

Example 3

Non-Breathable Adhesive

A non-textile layer film was produced as in Example 2, except that the adhesive used was a non-breathable MDI-based, moisture-cured polyether polyurethane as described in U.S. Pat. No. 4,532,316, herein incorporated by reference. This non-textile layer was then used to produce complete non-textile glove inserts of this invention using the same insert construction method described in Example 1 above. These non-textile glove inserts were then constructed into finished gloves using the same glove construction method described in Example 1 above.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

What is claimed is:

1. A seamed article comprising:
    (a) a first non-textile material comprising a first microporous polymer layer and a first thermoplastic polymer layer;
    (b) a second non-textile material comprising a second microporous polymer layer and a second polymer layer; and
    (c) a seam joining said first polymer layer to said second polymer layer,
    wherein said thermoplastic polymer layer is adjacent to and in contact with said second polymer layer,
    wherein at least one of (1) said first polymer layer and said first microporous layer and (2) said second polymer layer and said second microporous layer are adhered via an adhesive layer, and
    wherein said first non-textile material differs in composition from said second non-textile material.

2. The seamed article of claim 1 wherein the first non-textile material and the second non-textile material are breathable.

3. The seamed article of claim 1 wherein the first non-textile material and the second non-textile material are waterproof.

4. The seamed article of claim 1 wherein the first non-textile material and the second non-textile material are breathable and waterproof.

5. The seamed article of claim 1 wherein either the first non-textile material or the second non-textile material are breathable and waterproof.

6. The seamed article of claim 1 wherein the first polymer layer is a film layer.

7. The seamed article of claim 1, wherein said seamed article is adapted for insertion into an air permeable or water permeable shell, said shell being knit, woven, nonwoven, leather, or composite fabric shell.

8. The seamed article of claim 1, wherein said adhesive layer is selected from a discontinuous adhesive and a breathable continuous adhesive.

9. A seamed non-textile article comprising:
(a) a first non-textile material comprising a first microporous polymer layer and a thermoplastic polymer layer;
(b) a second non-textile material comprising a second microporous polymer layer; and a polymer layer;
(c) a seam joining said thermoplastic polymer layer to said polymer layer; and
(d) an interface layer where said thermoplastic polymer layer and said polymer layer meet,
wherein said thermoplastic polymer layer is adjacent to and in contact with said polymer layer,
wherein at least one of (1) said thermoplastic polymer layer and said first microporous polymer layer and (2) said polymer layer and said second microporous polymer layer are adhered via an adhesive layer, and
wherein said first non-textile material differs in composition from said second non-textile material.

10. The seamed article of claim 9 wherein the first non-textile material and the second non-textile material are waterproof.

11. The seamed article of claim 9 wherein the first non-textile material and the second non-textile material are breathable and waterproof.

12. The seamed article of claim 9 wherein at least one of the microporous polymer layers comprises an expanded polytetrafluoroethylene.

13. The seamed article of claim 9, wherein said seamed article is adapted for insertion into an air permeable or water permeable shell, said shell being knit, woven, nonwoven, leather, or composite fabric shell.

14. A seamed article consisting essentially of:
(a) a first non-textile material comprising a first microporous polymer layer and a thermoplastic polymer layer;
(b) a second non-textile material comprising a second microporous polymer layer and a polymer layer; and
(c) a seam joining said thermoplastic polymer layer to said polymer film layer,
wherein said thermoplastic polymer layer is adjacent to and in contact with said polymer layer, and
wherein said first non-textile material differs in composition from said second non-textile material.

15. The seamed article of claim 14, wherein said first microporous layer differs in composition from said second microporous layer.

16. The seamed article of claim 15, wherein said thermoplastic polymer layer differs in composition from said polymer layer.

17. The seamed article of claim 14, wherein said thermoplastic polymer layer differs in composition from said polymer layer.

18. The seamed article of claim 14, wherein at least one of the first and second microporous polymer layers comprises an expanded polytetrafluoroethylene.

19. The seamed article of claim 14, wherein at least one of (1) said first microporous polymer layer and said thermoplastic polymer layer and (2) said second microporous polymer layer and said polymer layer are adhered via an adhesive layer.

20. The seamed article of claim 14, wherein the first non-textile material and the second non-textile material are waterproof.

21. The seamed article of claim 14, wherein said seam exhibits a stiffness of less than 25 g/in.

22. The seamed article of claim 14, wherein said seam exhibits a strength greater than 4 pli.

23. The seamed article of claim 14, wherein said seamed article is adapted for insertion into an air permeable or water permeable shell, said shell being a knit, woven, nonwoven, leather, or composite fabric shell.

* * * * *

UNITED STATES PATENT AND TRADEMARK OFFICE
CERTIFICATE OF CORRECTION

| | | |
|---|---|---|
| PATENT NO. | : 8,776,270 B2 | Page 1 of 1 |
| APPLICATION NO. | : 12/431136 | |
| DATED | : July 15, 2014 | |
| INVENTOR(S) | : Mark Alan Williams et al. | |

It is certified that error appears in the above-identified patent and that said Letters Patent is hereby corrected as shown below:

In The Specification

At column 8, line 54: change "and other" to -- another --

At column 11, line 14: change "second first hand" to -- second hand --

At column 13, Table 2, first column: change "g/cm2/24 hr" to -- $g/cm^2/24$ hr --

Signed and Sealed this
Second Day of December, 2014

Michelle K. Lee
*Deputy Director of the United States Patent and Trademark Office*